United States Patent

[11] 3,548,144

[72] Inventor Joseph J. Riley
 Warren, Ohio
[21] Appl. No. 742,077
[22] Filed July 2, 1968
 Continuation-in-part of Ser. No. 629,519,
 Apr. 10, 1967, Pat. No. 3,443,584
[45] Patented Dec. 15, 1970
[73] Assignee The Taylor Winfield Corporation
 Warren, Ohio

[54] METHOD AND APPARATUS FOR CONTROLLING THE PLATEN OF A FLASH WELDER
 21 Claims, 9 Drawing Figs.
[52] U.S. Cl. .................................................. 219/97,
 219/100
[51] Int. Cl. ..................................................... B23k 11/04
[50] Field of Search ........................................... 219/97, 98,
 99, 100

[56] References Cited
 UNITED STATES PATENTS
2,770,709 11/1956 Moore et al. ............... 219/97
3,015,021 12/1961 Wangsjo et al. ............ 219/97
3,204,078 8/1965 Cavanagh .................. 219/97
2,404,620 7/1946 Cooper ...................... 219/97

Primary Examiner—J. V. Truhe
Assistant Examiner—R. E. O'Neill
Attorney—William J. Ruano ABSTRACT: A method and control system for controlling the movable platen of a flash welder utilizing an electrohydraulic servo mechanism. An electrical signal is furnished from a potentiometer which, in turn, is varied by the cam rise on a rotating cam to preprogram the platen travel so it will follow the cam contour, or, selectively, the level of voltage across the welding dies may be controlled to control the flashing operation as well as the upset operation. Such welding voltage control, together with the limit value of the servovalve current, controls the rate of movement of the movable platen in both forward and reverse direction by virtue of a feedback signal from the voltage across the welder dies. The welding die voltage is varied by introducing a small, constant value voltage whenever the die voltage is above a preselected value to cause forward platen motion during flashing and by introducing a similar constant value voltage of opposite polarity whenever the die voltage is below a preselected value to cause reverse platen motion during flashing (or upset). Thus the welding die voltage is maintained within predetermined limits and the flashing and upset operations are preprogrammed for optimum performance.

INVENTOR.
JOSEPH J. RILEY
BY
his ATTORNEY

METHOD AND APPARATUS FOR CONTROLLING THE PLATEN OF A FLASH WELDER

This application is a continuation-in-part of my application Ser. No. 629,519, filed Apr. 10, 1967 now U.S. Pat. No. 3,443,584.

This application relates to improvements in a method and control system for controlling the operation of a movable platen of a flash welder utilizing an electrohydraulic servomechanism. More particularly, this invention relates to the selective use of either mechanical cams or voltage control across the welding dies for controlling the rate of movement of the movable platen, which is also controlled by a servo valve, for controlling flashing as well as upset of a flash-butt welder.

A disadvantage of the cam preprogrammed system described in my earlier patent application, identified above, is that operations are dependent solely and entirely upon the shapes of rotating cams. Sometimes errors are introduced, such as by particles which may be deposited on a rotating cam, or perhaps in the incorrect adjustment or shaping of such cam. Moreover, changes in speed of movement of the movable platen can be made by changing the cam shape, which is time consuming.

An object of the present invention is to overcome the above-named disadvantages by providing preprogramming of the welder flashing action either by such cam preprogramming or by control of the voltage across the welding dies, so as to obtain the precise movement or rate of increase of speed of the movable platen, during certain phases, such as flashing and upset, as desired, with assurance of accurate control of the flashing and upset operations in both forward and reverse directions of the movable platen to obtain optimum welding performance.

Another object of the invention is to provide a more easily and quickly variable, preprogramming system for controlling the direction and speed of movements of the movable platen of a flash-butt welder.

Still another object of the invention is to provide a novel system for controlling flashing and upset of a butt-welder by controlling the voltage across the welding dies and by the limit value of servovalve current in both forward and reverse direction.

A still further object of the invention is to provide a novel control system for introducing a negative voltage of proper magnitude in the system only under certain conditions of movement of the platen to alter the direction or rate of such movement.

Another object of the invention is to provide a novel control system for a flash-butt welder which is responsive to voltage feedback across the welding dies and is capable of progressively changing the forward velocity of the movable platen during flashing by changing the secondary voltage as the result of changing the primary current ratio of the welding transformer.

Other objects and advantages will become more apparent from a study of the following description, taken with the accompanying drawings wherein:

FIG. 2A is a simplified, schematic view showing the relay sequence or the switching from "positioning" control, according to my earlier invention, to "voltage rate control" in accordance with the present invention, for selective preprogramming by either cam contour or by control of the voltage across the welding dies;

FIG. 5A is a chart showing movable platen displacement plotted versus time during flashing involving the use of a single resistor;

FIG. 5B is a chart, similar to FIG. 5A, but showing a curve instead of a straight line relationship, which curve is obtained from the use of multiple potentiometers, such as illustrated in FIG. 6; and, FIG. 6 is a schematic diagram of an improvement for providing the characteristic curve shown in FIG. 5B.

Figure 1:
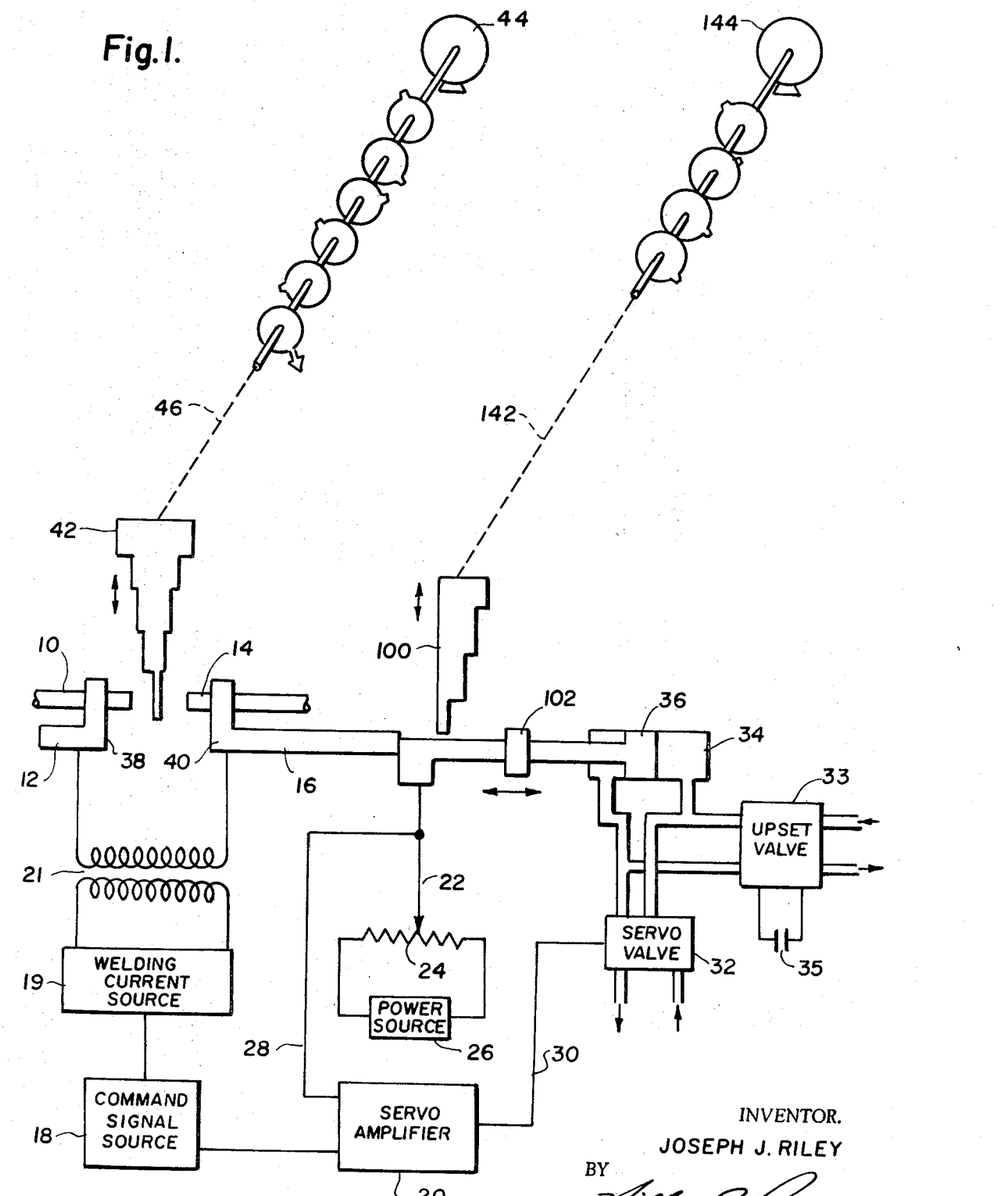
FIG. 1 is a schematic diagram of a flash-butt welder control system in accordance with the teachings of my earlier, above-identified patent application.

FIG. 1 of the drawing shows a flash welding control system as described in my above-identified earlier patent application. Numeral 10 denotes a workpiece, such as for example, a sheet of metal ranging from 25 to 100 inches wide and from several thousands of an inch to a quarter inch thick and which is clamped in a stationary platen 12 before commencing the welding operation. Workpiece 14 is a similar sheet or strip of metal which is clamped in a movable platen 16 so that it may be butt-welded to the end of sheet 10. Welding current is provided by the secondary of transformer 21 energized by a welding current source 19.

The movement of platen 16 with respect to platen 12 is controlled by signals from a command signal source 18, which signal corresponds to a particular distance or position of platen 16 with respect to platen 12. The command signal from source 18 is applied to a servoamplifier 20. Also a signal indicative of the instantaneous position of movable platen 16 is applied, through conductor 28, to the servoamplifier 20, which conductor is connected to a wiper 22 slidable along feedback potentiometer 24 energized by a power source 26. Since the wiper 22 is mechanically coupled to platen 16, it will cause generation of a signal indicative of the instantaneous position of movable platen 16.

Whenever the command signal from source 18 is different from the position indicated by the signal conducted by line 28, an error signal is applied over line 30 to a servovalve 32 of any well-known type. The magnitude of the error signal determines the amount of fluid metered to actuator cylinder 34 and, in turn, the amount of such metered fluid establishes the position of the movable platen 16 since such platen is mechanically connected to piston 36 of the actuator cylinder 34. An upset valve 33, which may be made inoperative by contactor 35, will cause similar movement of piston 36 in response to upset signals after flashing has been completed.

Preparatory to welding, space bar 42 is moved between workpieces 10 and 14 to various positions indicated by the stepped shape of space bar 42 for different conditions.

First, faces 38 and 40 of platens 12 and 16, respectively, must be cleaned off to rid them of foreign material accumulating on these faces during the prior welding operation, then ultimately space bar 42 determines the initial spacing between workpieces 10 and 14 before the welding operation is started. The vertical movement of space bar 42 is caused by rotation of a drive motor 44 which rotates various controlling cams on its drive shaft and drives a mechanical movement, indicated schematically by the dash lines 46, to effect vertical movement of space bar 42, the various cams to preprogram movements of the movable platen 16.

Similarly, gauge bar 100 is vertically moved in increments by rotation of a drive motor 144 which drives through a mechanical linkage 142. The position of gauge bar 100 with respect to upset nut 102 determines what the final die opening will be. Various control cams are also rotated by drive motor 144. The apparatus and system, so far described and illustrated in FIG. 1, is the same as that disclosed in my earlier application, identified above, with the exception that data processing equipment, such as a card reader (not shown) controlled by cams and described in said application have been eliminated from FIG. 1 since a voltage control system is used, instead, in accordance with the teachings of the present invention.

As disclosed in my earlier filed application, the motion of the movable platen 16 was caused by the electrical signal furnished from a command potentiometer in command signal source 18, which, in turn, was varied by the cam rise on a rotating cam. The platen travel motion, therefore, was preprogrammed, that is, it followed the cam contour. Attached to the same shaft as the cam causing platen travel movement were two other cams; one causing a change in secondary or welding voltage by varying the primary connection through switching ignitron contactors, and the other indicating the point of upsetting at the end of the flashing dimension. By physically fixing the position in space of these cams, it was readily possible to cause the voltage change as a fixed percentage of the total flash-off dimension, also to cause the upset to take place at the end of the flashing distance.

In accordance with the present invention, initial positioning of the movable platen may take place under the control of a cam as in my earlier application but the flashing operation may take place either through the preprogrammed cam, as disclosed in my earlier application, or by control of the level of voltage across the welding dies, in accordance with the present invention. In the latter instance, since the space point of travel of the movable platen for voltage change cannot be determined from the flashing cam if it is not used, other means are employed to detect this point as well as the point of upset, as will be described more fully hereinafter.

The inputs and outputs of the system will be described first, followed by further details concerning possible internal circuitry to perform the preprogrammed function according to the present invention.

Figures 2A, 5A, 5B, 6:
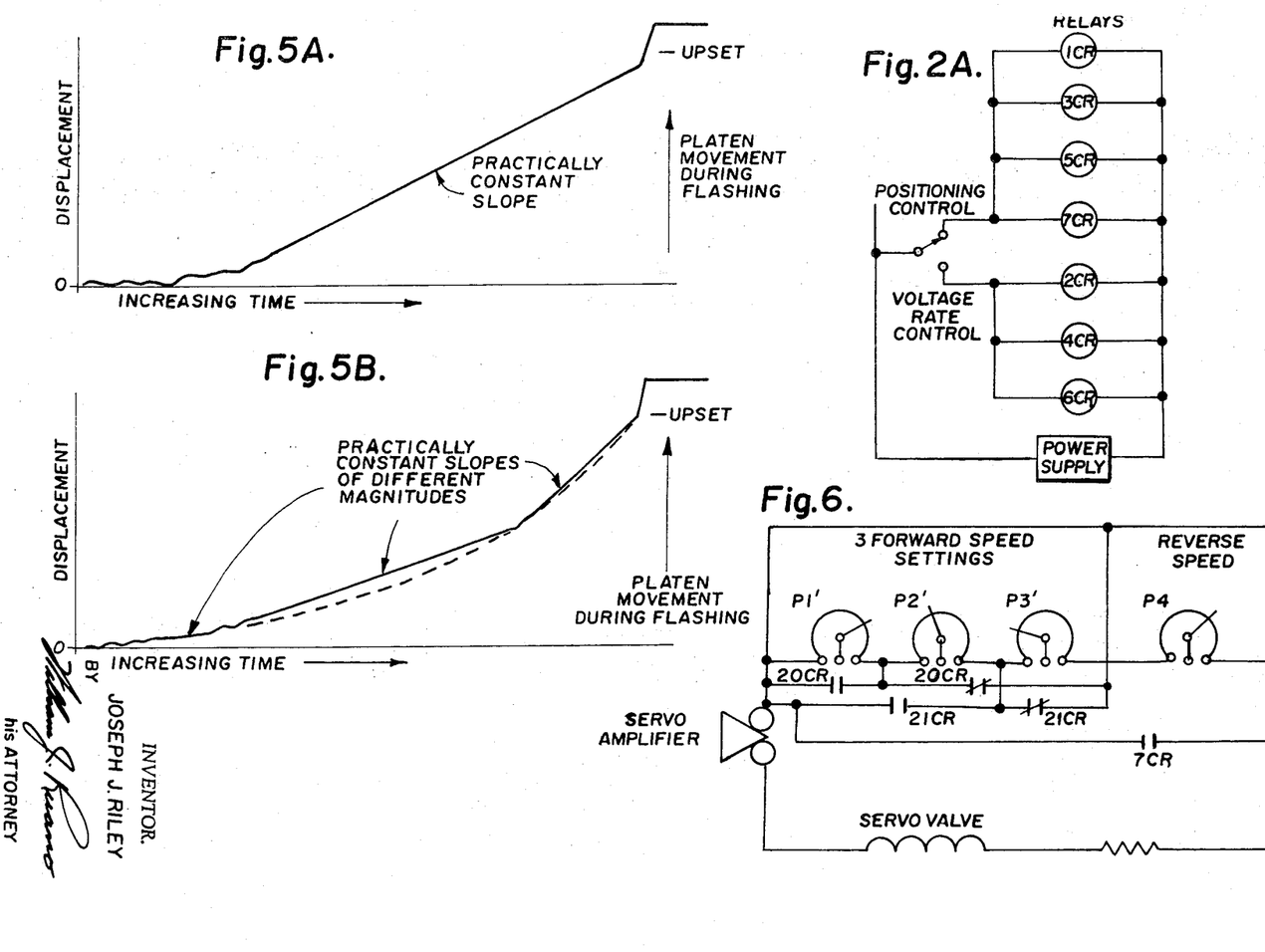
Figure 2B:
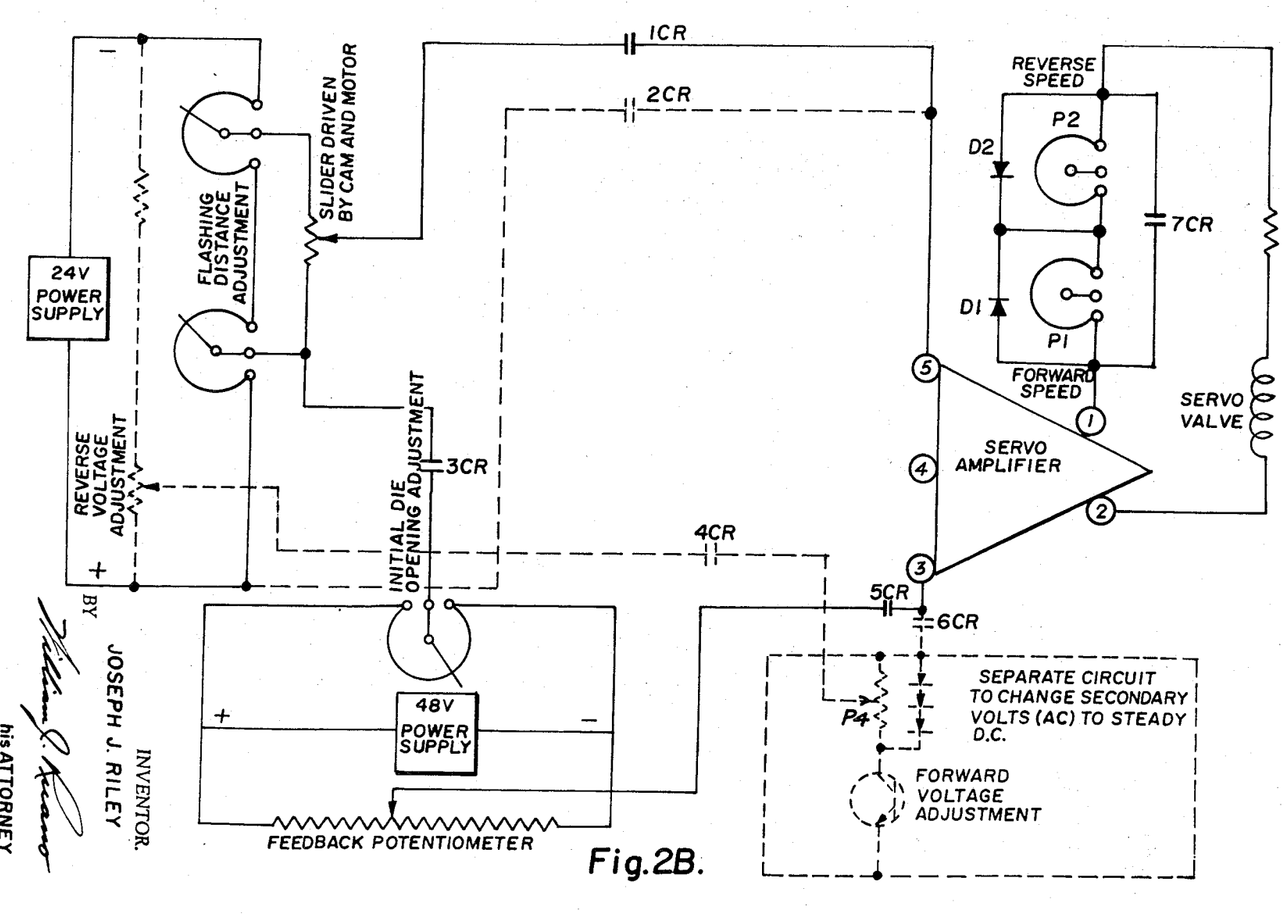
FIG. 2B is a simplified, schematic diagram showing a combined positioning and voltage rate control system for the movable platen which holds the workpiece of a flash-butt welder.

Referring to FIG. 2A, with the switch in Positioning Control position, relays 1CR, 3CR, 5CR, and 7CR are energized, whereas relays 2CR, 4CR and 6CR are deenergized. This "positioning control" is the same as in my earlier application, identified above, and illustrated schematically in FIG. 2B, and its action will be the same. Referring to FIG. 2B, in the interests of simplicity, simple potentiometers are shown rather than a series of resistor networks (which previously were necessary to indicate possible digital selection).

After the welder platen has been positioned at the initial die opening position and the switch (FIG. 2A) thrown to Voltage Rate Control position, relays 2CR, 4CR and 6CR are energized, the others are deenergized.

Referring to FIG. 2B, the feedback input from the feedback potentiometer is cut off from the servoamplifier system by 5CR contact opening. The input from the flashing potentiometer is cut off from the servoamplifier system by 1CR contact opening. The initial die opening signal is cut off by 3CR contact opening.

Introduced into the system according to the present invention is a slight negative voltage (about 1 volt) from the 24 volt supply with terminal 5 on the amplifier positive with respect to terminal 3. This causes the servovalve to shift which results in the platen retracting or separating the edges of the work to be welded. To make the platen go forward, a voltage (about 2 volts) with terminal 3 positive (6CR contact closing) and effectively terminal 5 negative (resulting from −2 +1 volt or effectively −1 volt applied to terminal 5) will shift the servovalve to cause the movable platen 16 to close the open ends to be welded.

The −2 volt signal from the separate circuit will appear only if the voltage across the dies is at an adjusted level which indicates that the pieces to be welded are either not in contact (or the circuit is open and secondary voltage applied) or the flashing is more or less steady. If the pieces butt (flashing stops), the negative 2 volt signal is lost and only the positive 1 volt signal is applied to the servoamplifier, causing the servovalve to shift and separate the butted ends.

In actual operation, it is not desirable for the pieces to separate initially. Therefore, when the switch (FIG. 2A) is thrown for Voltage Rate Control operation, it is necessary simultaneously to apply secondary voltage to the welding dies. Under these conditions the platen will immediately move forward. The pieces will touch and flashing will begin. However, if the velocity is too great (at this time with cold pieces), the work pieces 10, 14, will butt, dropping the voltage across the dies which results in the loss of the −2 volt signal. (Incidentally these voltage levels 1 and 2 are arbitrary as numbers which are being used to simplify the description).

The pieces now separate, therefore the die voltage rises as the quasi-short circuit pieces butting is removed, and the platen starts forward again. Flashing starts once again. It may last for a fraction of a second, then the pieces butt, retract and keep repeating these operations until the flashing action becomes steady (after pieces heat up) and until the desired point of upset is reached. The number of initial retractions can be varied by varying the level of die voltage (secondary voltage) and by adjusting the settings of the Forward Speed and Reverse Speed potentiometers P1 and P2 (FIG. 2B). A secondary adjustment is in the separate circuit introducing the minus 2 volts.

This is not a true proportional type servosystem when operating under Voltage Rate Control. When the forward signal appears, it is always constant at −2 volts although the time it appears within a half cycle (.0083 seconds) can be varied by a separate circuit adjustment, later described. The circuit is working properly even though the error voltage never reaches zero. As a consequence, the level of voltage at terminals 1 and 2, output of the amplifier, tends to reach constant values in both plus and negative directions (dependent on the gain setting of the amplifier) and polarity of input signals. Within this limitation, the maximum valve current and opening is practically limited which, in turn, controls the maximum level of forward and reverse platen velocity or the rate of flashing. The actual average flashing velocity, in any time increment, depends on the forward rate as set by the maximum valve current and the number of reversals caused by the butting action or the die voltage falling too low. Assuming a set value of forward valve current or maximum forward velocity, the number of reversals will decrease as the secondary voltage is raised. Raising the secondary voltage results in raising the secondary current. After a "butt," the platen again starts to move forward. It gains velocity with time (dependent on distance it has to travel before the pieces contact again).

When the pieces contact lightly, they have the option of contacting heavily enough to cause a butting condition, or if the secondary current is high enough to melt out (explosively) the initial contact which results in a flashing condition. After the weldment ends become successively hotter during the flashing action, the number of reversals decreases and the average forward speed increases. It works out that the level of secondary voltage has a marked effect on average forward velocity within a certain range of voltage.

After a level of voltage is reached where there is no tendency to reverse, the maximum forward velocity would depend on maximum valve coil setting only and not the secondary voltage. In normal operation, this condition is seldom obtained (and is not desired) because, in general, the flashing time may be too short for heat to build up in the pieces so that proper upsetting can occur.

Figure 3:
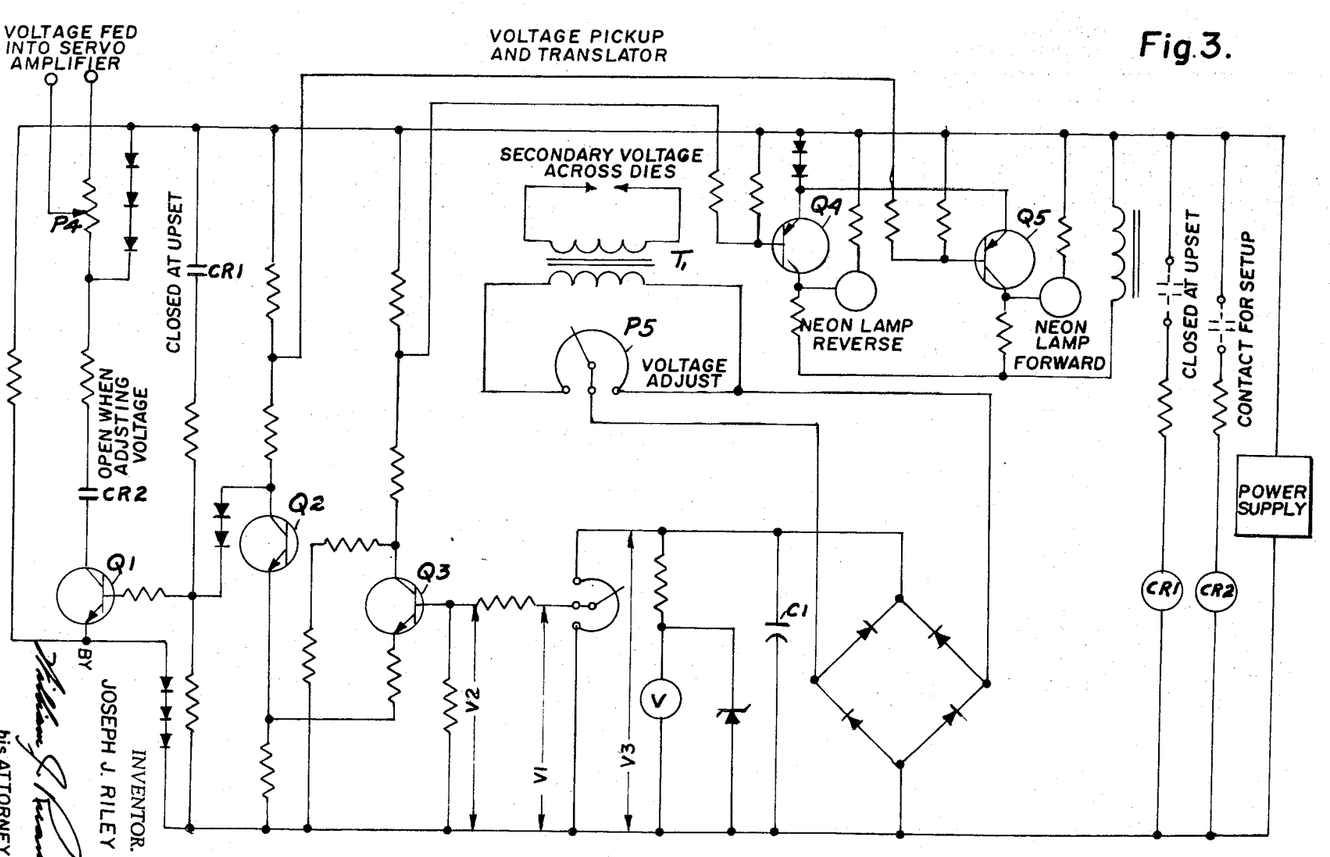
FIG. 3 is a schematic diagram showing the system for introducing a corrective control voltage of small magnitude across the welding dies by feeding such small voltage into the servo amplifier.

FIG. 3 shows the electronic circuit for introducing the step (−2 volt) signal. Its functions will be described briefly. The voltage across the dies is picked by transformer T1. P5 is adjusted until the meter reads a specific average voltage, V3. This adjustment is necessary as welding transformers are made with taps giving at least a 50 percent change in secondary voltage and it is desirable to keep V3 average value and waveform the same regardless of absolute r.m.s. value of secondary voltage across the dies. The output voltage from T1 is rectified by the full wave rectifier and partially filtered by capacitor C1. The output voltage V3 is a rectified partially filtered wave, the capacitor C1 determining the degree of filtering. If no filter were present, V3 would appear as a rectified sine wave going from zero to its maximum value. This means the V1 and V2 voltages would follow the same pattern from zero to the maximum value of the sine wave. By adding C1, the minimum value of V2 is raised above zero volts.

Transistors Q2 and Q3 form a Schmitt trigger circuit. When voltage (peak value) V2 is above a specific level, transistor Q3 conducts, goes into saturation and biases off transistor Q2. Thus if transistor Q3 is conducting, transistor Q2 is not. When transistor Q2 is not conducting (or saturated), transistor Q1 will conduct as its base is driven positive whenever transistor Q2 is off. The overall result is transistor Q1 conducts when transistor Q3 conducts. When transistor Q1 conducts, a constant voltage appears across potentiometer P4, held constant by the forward voltage drop of the diodes in series. A portion of this voltage is fed into the servoamplifier system to cause the platen to go forward.

Assuming a constant gain setting of the servoamplifier, it is this voltage that indirectly adjusts the magnitude of the servo output voltage at points 1 and 2 (FIG. 2B). Thus the servoamplifier gain can have an optimum setting (for greatest accuracy in "positioning" as in FIG. 2B) and by adjusting the potentiometer P4 voltage setting can have the desired response for Voltage Rate Control at the same gain control setting.

Transistors Q4 and Q5 effectively control the lighting of the neon lamps. The one associated with transistor Q4 will be off when the platen 16 is signaled forward and, therefore, is marked "reverse." The other is marked "forward."

To avoid the reverse signal during upsetting in which the die voltage definitely falls to the reversing level, CR1 relay is energized which causes transistor Q1 conduction or full forward signal. Upsetting is performed through a much larger solenoid valve 33 than the servovalve 32 (FIG. 1).

Figures 4A, 4B:
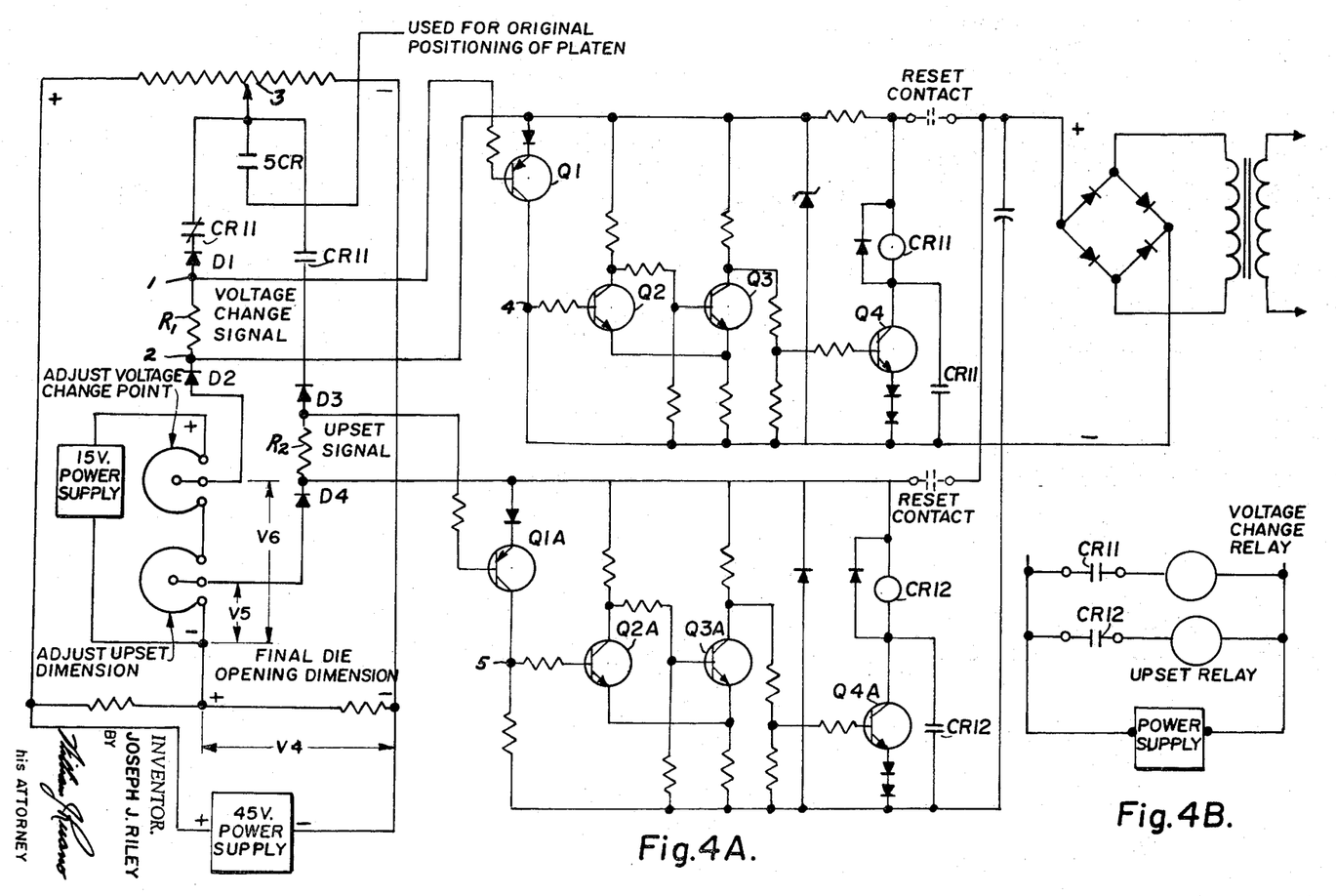
FIGS. 4A and 4B are schematic diagrams of the sensing circuits for the voltage change point and upsetting dimension.

FIG. 4A shows the circuit for detecting the voltage change point and the upsetting point. To use this idea, it is necessary to set the final die opening dimension electrically (voltage proportional to dimension) as well as mechanically. The platen after upset is assumed stopped by mechanical stops and not by locking hydraulic oil. Thus the upset dimension is not controlled by the upsetting valve, although the speed of upset is.

In normal practice, if a dual voltage (secondary voltage) cycle is used, the voltage change point will occur much earlier in the cycle than the upsetting point and this assumption is made in the way the circuit is drawn. (Incidentally, with Voltage Rate Control, it is doubtful if dual voltage is necessary, but it is being considered for completeness.)

The present description will be based on sensing the voltage change point, since the upset point is sensed in the same manner. The final die dimension, or most forward position of the platen after passing through the upset dimension, is represented by voltage V4. This electrical voltage is proportional to the final mechanical dimension but, as different from the positioning control setup, it has to be larger to compensate for the forward voltage drop of diodes D1 and D2. To simplify the explanation, it will be assumed that the forward voltage drop in the diodes is zero. There will be a voltage $V_p$ corresponding to the platen position at the initial die opening. This voltage will be greater than V6 + V4 since the voltage change point will occur during the flashing action after the movable platen leaves the initial die opening position and advances toward the stationary platen. When flashing starts by switching to Voltage Rate Control, relay 5CR (FIG. 2B) is deenergized which stops feedback into the servoamplifer system, but the potentiometer is still used to feedback the space position of the platen. Just immediately after the platen starts moving, point 3 (or the slider) is more positive than points 1 or 2 (FIG. 4A) and no voltage appears across resistor R1 because diodes D1 and D2 are back biased, stopping current flow. As the slider moves along, $V_p$ will become less than V4 + V6. At this point, current will pass through resistor R1 with point 2 positive with respect to point 1, since the diodes are now forward biased.

The voltage drop across resistor R1 starts transistor Q1, working as an amplifier, into conduction and steadily raising the voltage at point 4 until transistor Q2 snaps into conduction. Transistors Q2 and Q3 form the same type of trigger circuit as transistors Q2 and Q3 of FIG. 3. Transistor Q3 immediately goes off and transistor Q4 goes on, energizing relay CR11, which, in turn, signals the voltage change relay. Relay CR11 opens the voltage changing sensing circuit through resistor R1 and transfers to resistor R2. When $V_p$ is now greater than V4 + V5, nothing further happens; however as $V_p$ becomes less than V4+V5, transistor Q1A starts into conduction raising the voltage of point 5 until transistor Q2A snaps into conduction, causing relay CR12 to energize, energizing the upsetting relay and upset begins. The circuits cannot be reset until the platen 16 has opened to a position at least equal to the initial die opening so that the diodes are reverse biased.

As previously described, when using a single potentiometer for the forward speed of the platen, the platen would retract and go ahead several times and then steady flashing would start and the platen displacement with time would approach a linear relationship, similar to that shown in FIG. 5A. By using a series of potentiometers, as shown in FIG. 6, each one set to give the ideal rate during portions of the platen stroke, the ideal rate being governed in part by the amount of heat in the metal at the time, it is possible to generate a platen travel curve which indicates different flash-off rates or has the result of a curve (with acceleration), as shown in FIG. 5B. Three such potentiometers are indicated as shown in FIG. 6, and a smooth dashed curve is drawn through the end points of the resultant platen displacement with time curves as shown in FIG. 5B. By using more potentiometers, it would be possible to match the curve more exactly as done in mathematics.

These potentiometers P1', P2', P3', should be switched in and out with respect to distance the platen has traveled rather than a set time pattern. FIG. 5B shows the idea. The change point would be sensed in a similar manner as the voltage change point previously described in detail. The first obvious change in platen velocity would occur when relay 20CR was energized. The second change point or third velocity when relay 21CR is energized. By restoring to this system, it is possible to be more flexible in platen displacement with time which may be needed on the harder to flash weld high alloy steels. One potentiometer seems to do the job for low carbon steels.

A similar type of procedure could be used for the reverse potentiometer P4 but would not be as effective.

Another modification for producing a platen travel curve with different velocities in different regions can be effected by using one "forward" potentiometer or one valve current forward "limit" and a series of progressively increasing secondary voltages. As an example, say the first value is 5 volts and is to be used for one-quarter of the total flashing distance, the second value to be 6 volts from one-quarter to three-quarters of the total flashing distance, and the final value to be 7 volts. During the 5 volt interval, there will be constant advancing and retracting, which has the effect of preheating the work pieces. As the voltage is increased to 6 volts, the number of retractions will decrease, both because the pieces are hotter and the power level (secondary voltage) is higher resulting in a higher average velocity. In the third period at 7 volts, the number of retractions further decrease, resulting in a still higher average velocity.

A third modification would be a combination of the previous two modifications described in which both the secondary voltage is increased, in steps, and the forward valve current limit is also increased in steps. Combining these two features will make it possible to generate many types of platen travel curves to obtain optimum welding.

Incidently, while throughout this specification, the description is concentrated on voltage feedback, it is also possible to use primary current feedback. The signaling would be reversed, that is, when a butt would occur, the current would increase and would signal for retraction, whereas a current below a preset level, showing proper flashing, would signal for forward movement.

Thus it will be seen that I have provided an efficient, combined positioning and voltage rate control flashing system for flash welders in which the flashing action is controlled by the voltage across the welding dies and the limit value of servovalve current in both forward and reverse direction of the movable platen, whereby optimum welding conditions for flashing and upset may be easily and quickly provided.

While I have illustrated and described several embodiments of my invention, it will be understood that these are by way of illustration only, and that various changes and modifications may be made within the contemplation of my invention and within the scope of the following claims.

I claim:

1. In a control system for a flash welder including a stationary platen for holding one of the workpieces to be welded and a movable platen for holding the other of the workpieces to be welded; said control system comprising: prepositioning means responsive to the instantaneous position of said movable platen relative to said stationary platen for generating an electrical signal indicative of said position, rotating cam means for generating a command signal denoting the desired position of said movable platen relative to said stationary platen, electrohydraulic servomeans responsive to the welding voltage across said workpieces for moving said movable platen to the desired instantaneous position.

2. In a control system for a flash welder including a stationary platen for holding one of the workpieces to be welded and a movable platen for holding the other of the workpieces to be welded; said control system comprising: means responsive to the instantaneous position of said movable platen relative to said stationary platen for generating an electrical signal indicative of said position, means responsive to the welding voltage across said workpieces for generating a command signal denoting the desired position of said movable platen relative to said stationary platen, and electrohydraulic servomeans responsive to said command signal for moving said movable platen to the desired instantaneous position.

3. A control system as recited in claim 2 wherein the flashing action of the welder is controlled both by said voltage across the workpieces and by the limit value of servovalve current in both forward and reverse direction of movement of said movable platen.

4. A control system as recited in claim 2 including a potentiometer having a slider attached to said movable platen to serve as a position feedback for positioning in cooperation with said electrohydraulic servomeans, and means for disconnecting said potentiometer from said electrohydraulic servomeans so as to use said potentiometer as a position indicator of said movable platen for subsequent other operations.

5. A control system as recited in claim 2 including means for introducing into said control system a constant value control signal whenever the welding die voltage is above a predetermined value to cause forward motion of said movable platen during flashing.

6. A control system as recited in claim 2 including means for introducing into said control system a constant value control signal whenever the welding die voltage is below a predetermined value to cause reverse motion of said movable platen during flashing.

7. A control system as recited in claim 2 wherein a control signal of opposite polarity is introduced into said system when the die voltage is above a predetermined value to cause forward motion of said movable platen during flashing.

8. In a control system for a flash welder including a stationary platen for holding one of the workpieces to be welded and a movable platen for holding the other of the workpieces to be welded; said control system comprising: means responsive to the instantaneous position of said movable platen relative to said stationary platen for generating an electrical signal indicative of said position, means responsive to the welding voltage across said workpieces for generating a command signal denoting the desired position of said movable platen relative to said stationary platen, and electrohydraulic servo means responsive to said command signal for moving said movable platen to the desired position, said means responsive to the welding voltage including a transformer winding coupled to a winding connected across the welding dies, a potentiometer bridging said transformer winding, a full wave rectifier connected across said potentiometer, and a capacitor bridging the output of said rectifier.

9. A control system as recited in claim 8 including a transistor trigger circuit having an input connected across said capacitor, a potentiometer connected to the output of said trigger circuit, and rectifier means bridging said potentiometer whereby said potentiometer can be adjusted to give optimum operation of said servomeans during flashing while using the setting of voltage gain of said servomeans to give optimum conditions during positioning.

10. In a control system for a flash welder including a stationary platen for holding one of the workpieces to be welded and a movable platen for holding the other of the workpieces to be welded; said control system comprising: means responsive to the instantaneous position of said movable platen relative to said stationary platen for generating an electrical signal indicative of said position, means responsive to the welding voltage across said workpieces for generating a command signal denoting the desired position of said movable platen relative to said stationary platen, and electrohydraulic servomeans and amplifier responsive to said command signal for moving said movable platen to the desired position, said control system including a resistor through which current flows indicative of the position in space of said movable platen, and a relay operated by the output of said amplifier to effect further control functions.

11. In a control system for a flash welder including a stationary platen for holding one of the workpieces to be welded and a movable platen for holding the other of the workpieces to be welded; said control system comprising: means responsive to the instantaneous position of said movable platen relative to said stationary platen for generating an electrical signal indicative of said position, means responsive to the welding voltage across said workpieces for generating a command signal denoting the desired position of said movable platen relative to said stationary platen, and electrohydraulic servomeans responsive to said command signal for moving said movable platen to the desired position, said electrohydraulic servomeans including a servoamplifier and a servovalve connected in series with potentiometer means across the output of said servoamplifier.

12. A control system as recited in claim 11 wherein said potentiometer means comprises a "forward" speed potentiometer in series with a "reverse" speed potentiometer, a pair of diodes connected in opposite, one shunting each of said potentiometers so that the setting of one does not affect the setting of the other potentiometer.

13. A control system as recited in claim 12 wherein said "forward" speed potentiometer comprises a plurality of resistors sequentially inserted in the circuit so as to progressively increase the forward velocity of said movable platen.

14. A control system as recited in claim 12 including means for adjusting upset by introducing a voltage of a magnitude corresponding to the desired position of upset by said movable platen, and an upset valve operated by said voltage when said movable platen has moved to said desired upset position.

15. A control system as recited in claim 12 including means responsive to said welding voltage for changing the primary turns ratio of the welding transformer so as to change secondary voltage during flashing.

16. A control system as recited in claim 15 together with means for progressively changing the forward velocity of said movable platen by changing the limit value of valve current by switching in different values of resistance in valve coil circuit.

17. In a flash welder including a stationary platen, a movable platen for supporting workpieces to be butt-welded, and electrohydraulic servomeans for moving said movable platen in opposite directions; the method of controlling the movement of said movable platen during flashing comprising, generating a command signal in response to the welding voltage across said workpieces for denoting the desired position of said movable platen relative to said stationary platen, and applying to said electrohydraulic servomeans said command signal for moving said movable platen to the desired position in both forward and reverse directions of movement of said movable platen.

18. The method as recited in claim 17 wherein the limit value of said servomeans current, in both forward and reverse direction of said movable platen, is also a component of said welding control voltage.

19. The method recited in claim 17 wherein flashing action of said welder is selectively controlled in response to either said welding voltage or to a preprogrammed cam which is rotated to generate a predetermined, nonlinear voltage pattern with respect to time which is indicative of the desired position of said movable platen relative to said stationary platen.

20. The method recited in claim 17 including injecting into said command signal a constant value control signal whenever the die voltage is above a preselected magnitude to cause forward motion during flashing.

21. The method recited in claim 17 including injecting into said command signal a constant voltage signal of opposite polarity when the die voltage is below a preselected magnitude to cause reverse motion during flashing.